(12) United States Patent
Frank

(10) Patent No.: US 11,802,590 B2
(45) Date of Patent: Oct. 31, 2023

(54) DEVICE AND METHOD FOR ASSEMBLING A SLIDING BEARING

(71) Applicant: Schaeffler Technologies AG & Co. KG, Herzogenaurach (DE)

(72) Inventor: Stanislav Frank, Osnabrück (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/773,191

(22) PCT Filed: Jul. 1, 2020

(86) PCT No.: PCT/DE2020/100571
§ 371 (c)(1),
(2) Date: Apr. 29, 2022

(87) PCT Pub. No.: WO2021/083447
PCT Pub. Date: May 6, 2021

(65) Prior Publication Data
US 2022/0403890 A1 Dec. 22, 2022

(30) Foreign Application Priority Data
Oct. 30, 2019 (DE) .......................... 102019129271.9

(51) Int. Cl.
*F16C 43/02* (2006.01)
(52) U.S. Cl.
CPC .................................... *F16C 43/02* (2013.01)
(58) Field of Classification Search
CPC ....................................................... F16C 43/02
See application file for complete search history.

(56) References Cited

U.S. PATENT DOCUMENTS 3,683,474 A  8/1972  Young, Jr.

FOREIGN PATENT DOCUMENTS

| CN | 104121294 | | 10/2014 |
| CN | 206626106 U | * | 11/2017 |
| DE | 1869889 | | 4/1963 |
| DE | 202004013252 | | 12/2005 |
| DE | 102006044637 | | 3/2008 |
| DE | 102007053529 | | 5/2009 |
| DE | 102010023647 | | 12/2011 |
| DE | 102008031824 | | 3/2012 |

(Continued)

OTHER PUBLICATIONS

DE-102011007346-A1 English translation (Year: 2012).*

(Continued)

*Primary Examiner* — Jason L Vaughan
*Assistant Examiner* — Amanda Kreiling
(74) *Attorney, Agent, or Firm* — Volpe Koenig

(57) ABSTRACT

A device for assembling a sliding bearing, in particular a spherical bearing, which has an inner ring and a divided outer ring, the device including a clamping ring provided for receiving the outer ring, the inner diameter of the clamping ring corresponding at most to the outer diameter of the outer ring in the maximally compressed state thereof. To shrink the clamping ring onto the outer ring and to detach the clamping ring from the outer ring, a temperature control device, in particular in the form of an induction-heating device, which heats the clamping ring, is provided.

20 Claims, 1 Drawing Sheet

(56) References Cited

FOREIGN PATENT DOCUMENTS

| DE | 102010046017 | | 3/2012 | |
|---|---|---|---|---|
| DE | 102010046017 | A1 * | 3/2012 | ............ B23P 11/025 |
| DE | 102011007346 | A1 * | 10/2012 | ............ B21D 26/14 |
| DE | 102013213638 | | 1/2015 | |
| DE | 102017206705 | | 10/2018 | |
| DE | 102017206705 | A1 * | 10/2018 | ............ B23P 11/00 |
| DE | 102018200309 | | 2/2019 | |
| WO | 2011020464 | | 2/2011 | |
| WO | 2015172781 | | 11/2015 | |

OTHER PUBLICATIONS

DE-102010046017-A1 English translation (Year: 2012).*
CN-206626106-U English translation (Year: 2017).*
DE-102017206705-A1 English translation (Year: 2018).*

* cited by examiner

DEVICE AND METHOD FOR ASSEMBLING A SLIDING BEARING

CROSS-REFERENCE TO RELATED APPLICATIONS

This application is the U.S. National Phase of PCT Appln. No. PCT/DE2020/100571, filed Jul. 1, 2020, which claims priority from German Patent Application No. DE 10 2019 129 271.9, filed Oct. 30, 2019, the entire disclosures of which are incorporated by reference herein.

TECHNICAL FIELD

The disclosure relates to a device for assembling a sliding bearing, in particular a spherical bearing. The disclosure further relates to a method for assembling a sliding bearing.

BACKGROUND

DE 10 2006 044 637 A1 discloses a spherical bearing which has an outer ring and an inner ring which are designed as divided rings. The inner ring of the spherical bearing is held together by two divided clamping rings.

WO 2011/020464 A1 discloses a bearing ring for a rolling bearing or a sliding bearing, which includes a base body and a coating. Here, the base body has a fiber-reinforced plastic having fibers arranged in a plastic matrix, in particular in a hardened resin matrix, while the coating material comprises a ceramic.

DE 10 2018 200 309 A1 describes a rolling bearing arrangement having an outer ring and an inner ring, the outer ring having an additional support ring which extends at least over an axial partial area of the outer ring running concentrically to the axis of rotation of the rolling bearing arrangement.

Various variants of sliding materials intended for use in sliding bearings are described, for example, in the publications DE 10 2010 023 647 A1, WO 2015/172 781 A1 and DE 10 2008 031 824 B4.

SUMMARY

The disclosure is based on the object of further developing the assembly of a sliding bearing compared to the prior art with regard to a particularly high level of process reliability and long-term usability of assembly components.

This object is achieved according to the disclosure by a device designed for assembling a sliding bearing having a divided outer ring and having one or more of the features disclosed herein. The object is also achieved by a method for assembling a sliding bearing having one or more of the features disclosed herein. The configurations and advantages explained below in connection with the assembly method also apply accordingly to the device for assembling and vice versa.

The device according to disclosure is designed to assemble a sliding bearing, in particular in the form of a spherical bearing, having a typically single-piece inner ring and a divided outer ring. A divided outer ring means a bearing outer ring which has at least one split gap. A completely divided outer ring, that is to say an outer ring having two split gaps, in particular bursting slots, which are diametrically opposite one another on the circumference of the outer ring, also falls under the definition of a divided outer ring.

To accommodate the outer ring during assembly, a clamping ring is provided in any case, the inner diameter of which corresponds at most to the outer diameter of the outer ring in its maximally compressed state. Furthermore, a temperature control device designed to heat up the clamping ring is provided, which on the one hand enables the clamping ring to be shrunk onto the outer ring and on the other hand enables the clamping ring to be detached from the outer ring.

In a preferred embodiment, the temperature control device is an induction-heating device, i.e., an inductor. The induction-heating device is preferably designed to generate an electric current with a frequency of at least 10 kHz. With such a high-frequency alternating current, it is possible, using the skin effect, to heat up areas of the clamping ring close to the surface in a targeted manner. This minimizes heat input into parts that are not to be heated, in particular the outer ring. In a preferred execution of the method, the heat input into the outer ring when the clamping ring is heated corresponds at most to 20%, in particular not more than 10%, of the heat input into the clamping ring.

The sliding bearing is preferably a spherical bearing, with the clamping ring having a circular-cylindrical inner peripheral surface corresponding to the shape of the outer ring. In an advantageous embodiment, the specific electrical conductivity of the clamping ring is higher than the specific electrical conductivity of the outer ring.

In general, the method for assembling a sliding bearing comprises the following steps:
 providing an inner ring as the first bearing ring,
 providing a second bearing ring, namely an outer ring, which has at least one split gap, in particular in the form of a bursting slot,
 lining the outer ring with a sliding lining that is still unhardened at this stage of the method,
 inserting the inner ring into the outer ring, wherein the outer ring is bent open at least slightly and the sliding lining, in particular in the form of a sliding fabric, is still in the unhardened state,
 shrinking a clamping ring onto the outer ring,
 hardening the sliding lining with the clamping ring in place, and
 heating up the clamping ring and disassembling the clamping ring from the outer ring.

The clamping ring is preferably heated both before it is shrunk on and at a later point in time, for the purpose of disassembly, by means of induction. The sliding fabric hardens completely when the clamping ring is placed on the outer ring. The clamping ring ensures that the split gap cannot widen during the entire hardening period. After the sliding fabric has hardened, the outer ring remains in the shape into which it was forced by the clamping ring. The split gap can be used in later manufacturing steps, when installing the sliding bearing in a surrounding structure, to indicate the angular position of the outer ring.

A particular advantage of the disclosure lies in the fact that the clamping ring is subjected to practically no wear, is easy to handle and requires no pretreatment prior to its use in the assembly of the sliding bearing. Overall, the assembly process can thus be carried out efficiently, with one and the same clamping ring being usable for a large number of sliding bearings to be assembled one after the other.

BRIEF DESCRIPTION OF THE DRAWINGS

In the following, an exemplary embodiment according to the disclosure is explained in more detail by means of a drawing. In the figures.

DETAILED DESCRIPTION

Figure 1:
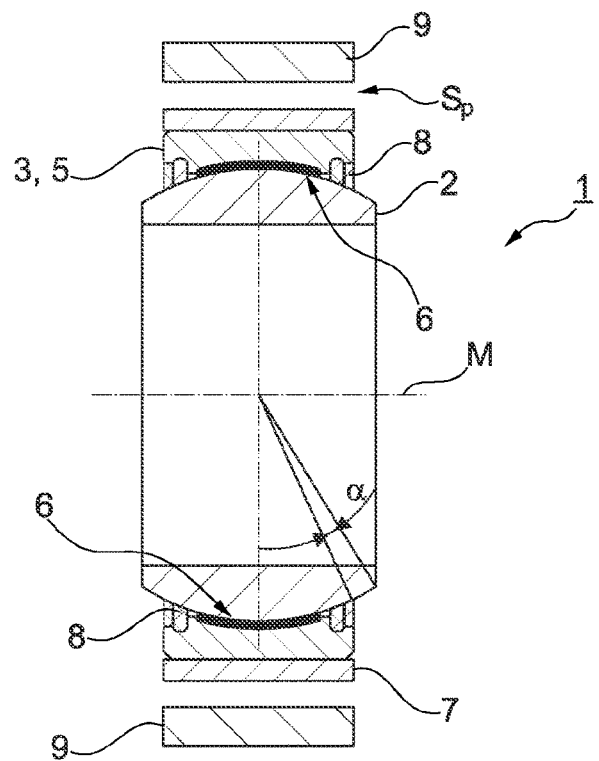
FIG. 1 shows a device comprising a clamping ring for assembling a sliding bearing.

A sliding bearing identified overall with the reference symbol 1 is designed as a spherical bearing and comprises an inner ring 2 and an outer ring 3 as sliding bearing rings. In contrast to the inner ring 2, the outer ring 3 has a bursting slot 4 and is therefore considered a divided bearing ring. Sealing rings held in the outer ring 3 are designated with 8.

The outer ring 3 is made up of a metal base body 5 and a sliding lining 6 that contacts the inner ring 2. The sliding lining 6 comprises a sliding fabric. Components of the sliding fabric are fibers, in particular PTFE and/or carbon fibers, contained in a resin matrix. The central axis of the sliding bearing 1 is designated with M. The inner ring 2 can be tilted by an angle α relative to the outer ring 3.

To insert the inner ring 2 into the outer ring 3 with the sliding lining 6 not yet hardened, the outer ring 3 is slightly bent open. The split gap 4, that is to say the bursting slot, is then closed again with the aid of a clamping ring 7, which is also referred to as a hardening clamp.

As long as the temperature of the clamping ring 7 corresponds to the temperature of the outer ring 3, the inner diameter of the clamping ring 7 corresponds at most to the outer diameter of the outer ring 3. The clamping ring 7 can therefore not be assembled on the outer ring 3 in this state.

To enable the clamping ring 7 to be assembled on the outer ring 3, the clamping ring 7 is heated with the aid of a temperature control device 9, which is designed as an induction-heating device and is indicated symbolically in FIG. 1. The induction-heating device 9, which is also referred to as an inductor for short, generates alternating current with a frequency of at least 10 kHz. An annular gap between the inductor 9 and the clamping ring 7 is designated with $S_p$ in FIGS. 1 and 2.

The high frequency of the alternating current, utilizing the skin effect known per se, ensures that the current flow and thus also the heating occurs mainly on the surface of the clamping ring 7. The specific electrical conductivity of the clamping ring 7 is higher than the specific electrical conductivity of the outer ring 3 and the inner ring 2.

Figure 2:
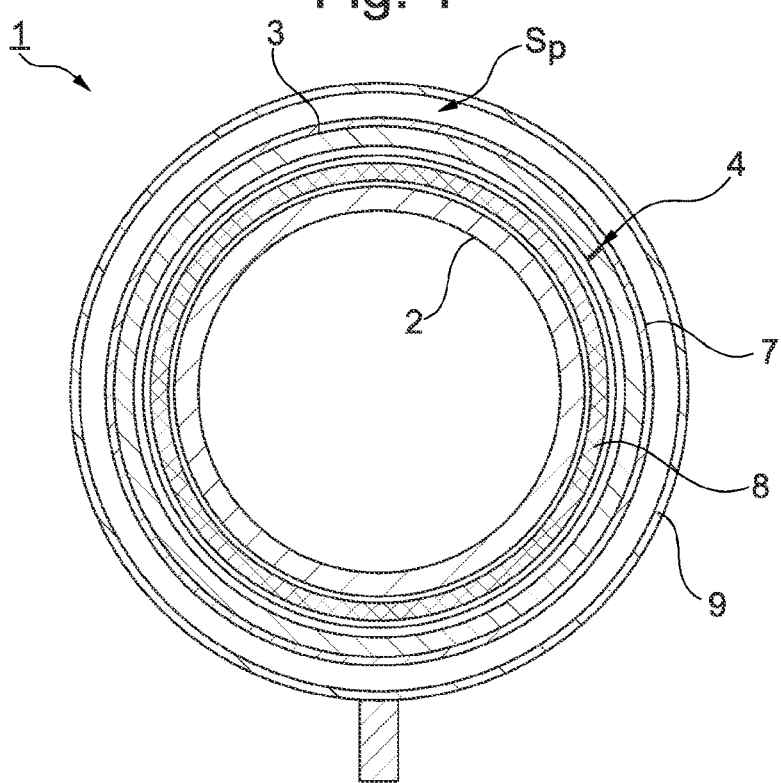
FIG. 2 shows the sliding bearing and the clamping ring in a front view.

The heated clamping ring 7 is placed on the outer ring 3 of the sliding bearing 1, so that the constellation shown in FIGS. 1 and 2 results. Due to the subsequent cooling of the clamping ring 7, which occurs as soon as the clamping ring 7 is placed on the outer ring 3, the clamping ring 7 generates a significant clamping force acting on the outer ring 3. The split gap 4 is closed in this state, i.e., when the clamping ring 7 is shrunk thereonto. The sliding lining 6 hardens completely when the clamping ring 7 is placed on the sliding bearing 1.

To remove the clamping ring 7 after the sliding lining 6 has hardened, the clamping ring 7 is heated again with the aid of the induction-heating device 9, with only a small amount of heat being introduced into the outer ring 3. Compared to the amount of heat introduced into the clamping ring, the amount of heat introduced into the outer ring 3 is no more than 10%, so that—also because of the short heating-up time—only a slight heating of the outer ring 3 occurs, which is practically not associated with a change in diameter. In particular, the already mentioned skin effect ensures that the heating rate of the clamping ring 7 is significantly higher than the rate of heat transfer from the clamping ring 7 to the outer ring 3. Due to the heat-related expansion of the clamping ring 7 when it is disassembled, an air gap is also created between the clamping ring 7 and the outer ring 3 that is not visible in the figures. This air gap acts as an insulator, which minimizes the heat transfer between the clamping ring 7 and the outer ring 3.

Due to the temperature-related expansion of the clamping ring 7, it can be removed from the sliding bearing 1 with practically no effort, and depending on the orientation of the sliding bearing 1, the clamping ring 7 can even fall off due to gravity. The outer ring 3 having the hardened sliding lining 6 then has a stable shape, so that no further stabilization of the outer ring 3, for example with an additional ring, is required. The clamping ring 7 is not subject to any technically significant compromise during the assembly process and can therefore be used for the process-reliable assembly of a large number of sliding bearings 1 of the same type.

LIST OF REFERENCE SYMBOLS

1 Sliding bearing
2 Inner ring
3 Outer ring
4 Split gap, bursting slot
5 Base body
6 Sliding lining
7 Clamping ring
8 Sealing ring
9 Temperature control device, inductor
α Angle
M Central axis
$S_p$ Gap

The invention claimed is:

1. A device for assembling a sliding bearing having inner and outer sliding bearing rings, said device comprising:
   a clamping ring configured to receive the outer bearing ring, an inner diameter of said clamping ring corresponding at most to an outer diameter of the outer bearing ring in a maximally compressed state thereof; and
   a temperature control device that heats the clamping ring to enable the clamping ring to be shrunk onto the outer bearing ring and enabling the clamping ring to be detached from the outer bearing ring.

2. The device according to claim 1, wherein the temperature control device comprises an induction-heating device.

3. The device according to claim 2, wherein the induction-heating device is configured to generate a current with a frequency of at least 10 kHz.

4. The device according to claim 1, the sliding bearing is a spherical bearing and the clamping ring has a circular-cylindrical inner peripheral surface.

5. The device according to claim 1, wherein the clamping ring has a higher specific electrical conductivity than the outer bearing ring.

6. The device according to claim 1, wherein the clamping ring is heated predominantly on a surface thereof.

7. The device according to claim 6, wherein a heat input into the outer bearing ring when heating up the clamping ring for the detachment is at most 20% of the heat input into the clamping ring.

8. The device according to claim 1, wherein an annular gap is present between the temperature control device and the clamping ring during the heating of the clamping ring.

9. The device according to claim 1, wherein the inner diameter of the clamping ring is greater than an outermost diameter of the inner bearing ring.

10. A method for assembling a sliding bearing, comprising the following steps:
providing an inner bearing ring;
providing an outer bearing ring which has at least one split gap;
lining the outer bearing ring with a non-hardened sliding lining;
inserting the inner bearing ring into the outer bearing ring, including bending the outer bearing ring open and the sliding lining being in an unhardened state;
shrinking a clamping ring onto the outer bearing ring;
hardening the sliding lining; and
heating up and disassembling the clamping ring from the outer bearing ring.

11. The method according to claim 10, wherein the clamping ring is heated by induction both before the shrinking on step and before the disassembling.

12. The method according to claim 11, wherein the clamping ring is heated predominantly on a surface thereof.

13. The method according to claim 12, wherein a heat input into the outer bearing ring when heating up the clamping ring is at most 20% of the heat input into the clamping ring.

14. A method for assembling a sliding bearing, comprising the following steps:
providing an inner bearing ring;
providing an outer bearing ring which has at least one split gap;
lining the outer bearing ring with a non-hardened sliding lining;
inserting the inner bearing ring into the outer bearing ring with the sliding lining being in an unhardened state;
heating a clamping ring such that a diameter of the clamping ring expands;
placing the clamping ring on the outer bearing ring;
shrinking the clamping ring onto the outer ring;
hardening the sliding lining; and
heating up and disassembling the clamping ring from the outer bearing ring.

15. The method according to claim 14, wherein the heating of the clamping ring is carried out by induction heating.

16. The method according to claim 15, further comprising carrying out the induction-heating device with a current having a frequency of at least 10 kHz.

17. The method according to claim 14, wherein the clamping ring is heated predominantly on a surface thereof.

18. The method according to claim 17, wherein a heat input into the outer bearing ring when heating up the clamping ring for the disassembling is at most 20% of the heat input into the clamping ring.

19. The method according to claim 14, wherein the heating up of the outer bearing ring in the disassembling step creates an air gap between the clamp ring and the outer bearing ring.

20. The method according to claim 14, wherein the clamping ring is provided with a higher specific electrical conductivity than the outer bearing ring.

* * * * *